(12) United States Patent
Oh et al.

(10) Patent No.: US 9,596,131 B2
(45) Date of Patent: Mar. 14, 2017

(54) METHOD FOR TRANSITING OPERATION MODE OF ROUTING PROCESSOR

(71) Applicant: ELECTRONICS AND TELECOMMUNICATIONS RESEARCH INSTITUTE, Daejeon (KR)

(72) Inventors: Sang Yoon Oh, Daejeon (KR); Kwang Yong Lee, Daejeon (KR); Beob Kyun Kim, Daejeon (KR); Seong Moon, Deajeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 229 days.

(21) Appl. No.: 14/599,620

(22) Filed: Jan. 19, 2015

(65) Prior Publication Data
US 2015/0256383 A1 Sep. 10, 2015

(30) Foreign Application Priority Data
Mar. 5, 2014 (KR) .................. 10-2014-0026167

(51) Int. Cl.
*H04L 12/24* (2006.01)
*H04L 12/931* (2013.01)

(52) U.S. Cl.
CPC .......... *H04L 41/0668* (2013.01); *H04L 49/00* (2013.01)

(58) Field of Classification Search
CPC .................. H04L 41/0668; H04L 67/1051
USPC .................. 709/208, 209; 714/12; 713/1
See application file for complete search history.

(56) References Cited

U.S. PATENT DOCUMENTS

| | | | |
|---|---|---|---|
| 2002/0055978 A1 | 5/2002 | Joon-Bo et al. | |
| 2003/0198182 A1 | 10/2003 | Pegrum et al. | |
| 2008/0291906 A1 | 11/2008 | Chigurupati et al. | |
| 2013/0121158 A1* | 5/2013 | Balasubramanian | H04L 12/437 370/241 |

FOREIGN PATENT DOCUMENTS

| | | |
|---|---|---|
| KR | 10-2008-0072165 A | 8/2008 |
| KR | 10-2011-0065266 A | 6/2011 |

* cited by examiner

*Primary Examiner* — Huy D Vu
*Assistant Examiner* — Teisha D Hall
(74) *Attorney, Agent, or Firm* — LRK Patent Law Firm

(57) ABSTRACT

A method for transiting an operation mode of a routing processor is provided, which allows each routing processor in a packet processing system to be transited among a slave operation mode, a slave stand-by mode, a master stand-by mode, and a master operation mode to allow the packet processing system to normally operate even though a failure occurs in the routing processor that is set in the master operation mode, a new routing processor is added, or the routing processor set in the master operation mode is initialized.

11 Claims, 5 Drawing Sheets

METHOD FOR TRANSITING OPERATION MODE OF ROUTING PROCESSOR

CROSS-REFERENCE TO RELATED APPLICATIONS

This application claims priority to and the benefit of Korean Patent Application No. 10-2014-0026167 filed in the Korean Intellectual Property Office on Mar. 5, 2014, the entire contents of which are incorporated herein by reference.

TECHNICAL FIELD

The present invention relates to a method for transiting an operation mode of a routing processor, and more particularly, to a technology that in a packet processing system including a plurality of routing processors, each routing processor transits an operation mode (master or slave) thereof.

BACKGROUND ART

When a failure occurs in a routing processor that processes a packet on the Internet, the failure influences traffic of the Internet.

In order to minimize the influence, a dualization scheme is proposed, which includes a plurality of same routing processors to operate one routing processor in a master mode and residual routing processors in a slave mode. In this case, the routing processor that operates in the slave mode periodically communicates with the routing processor that operates in the master mode to synchronize routing data and state information of the routing processor, and as a result, when the failure occurs in the routing processor that operates in the master mode afterwards, the routing processor that operates in the slave mode can be operated in the master mode based on received routing data and state information. Accordingly, an external system cannot sense the failure of the routing processor that operates in a master mode and recognizes that the routing processor continuously operates.

In the case of a general dualization system, only one slave module is provided, and as a result, the operation mode is simply transited as described above.

When only one slave module is provided as described above, and even the slave module has the failure, there is also a problem that the entire system is down, and as a result, most of dualization systems include a plurality of slave modules in recent years.

As the related art, there is a technology in which residual slave modules operate in a new master mode according to a predetermined order when power of the master module is exhausted or the master module deviates from a private handy network, but an order of adding the slave module needs to be determined again, and an optimal slave module cannot be selected as the master module under a current system environment.

For example, when it is assumed that the priority is the order of slave module #1, slave module #2, and slave module #3 is assumed, in the case where the failure occurs in the master module, a subsequent master needs to be unconditionally slave module #1. In this case, a network environment of slave module #2 may be better than a network environment of slave module #1.

SUMMARY OF THE INVENTION

The present invention has been made in an effort to provide a method for transiting an operation mode of a routing processor that allows each routing processor in a packet processing system to be transited among a slave operation mode, a slave stand-by mode, a master stand-by mode, and a master operation mode to allow the packet processing system to normally operate even though a failure occurs in the routing processor that is set in the master operation mode, a new routing processor is added, or the packet processing system is initialized.

An exemplary embodiment of the present invention provides a method in which one initialized routing processor transits an operation mode in a packet processing system including a plurality of routing processors, including: verifying whether an ID message is received by entering a slave stand-by mode; operating in a slave operation mode immediately when the ID message is received within a first stand-by time according to the verifying result; transmitting the ID message to the other routing processors for a first threshold time by entering a master stand-by mode when the ID message is not received within the first stand-by time according to the verifying result; and contending of entering a master operation mode when the ID message is not received from the other routing processors within the first threshold time in the master stand-by mode and entering a slave operation mode through the slave stand-by mode or the master operation mode by contention when the ID message is received.

Another exemplary embodiment of the present invention provides a method in which one routing processor that operates in a slave operation mode transits an operation mode when a master has a failure in a packet processing system including a plurality of routing processors, including: entering a master stand-by mode through a slave stand-by mode when an ID message is not received for a second threshold time; transmitting the ID message to other routing processors in the master stand-by mode for a first threshold time; and contending of entering a master operation mode when the ID message is not received from the other routing processors within the first threshold time in the master stand-by mode and entering a slave operation mode through the slave mode or the master operation mode by contention when the ID message is received.

According to exemplary embodiments of the present invention, an operation mode of each routing processor in a packet processing system is allowed to be transited among a slave operation mode, a slave stand-by mode, a master stand-by mode, and a master operation mode to allow the packet processing system to normally operate even though a failure occurs in the routing processor that is set in the master operation mode, a new routing processor is added, or the packet processing system is initialized.

Objects of the present invention are not limited the aforementioned object and other objects and advantages of the present invention, which are not mentioned can be appreciated by the following description and will be more apparently know by the exemplary embodiments of the present invention. It can be easily known that the objects and advantages of the present invention can be implemented by the means and a combination thereof described in the appended claims.

Figure 1:
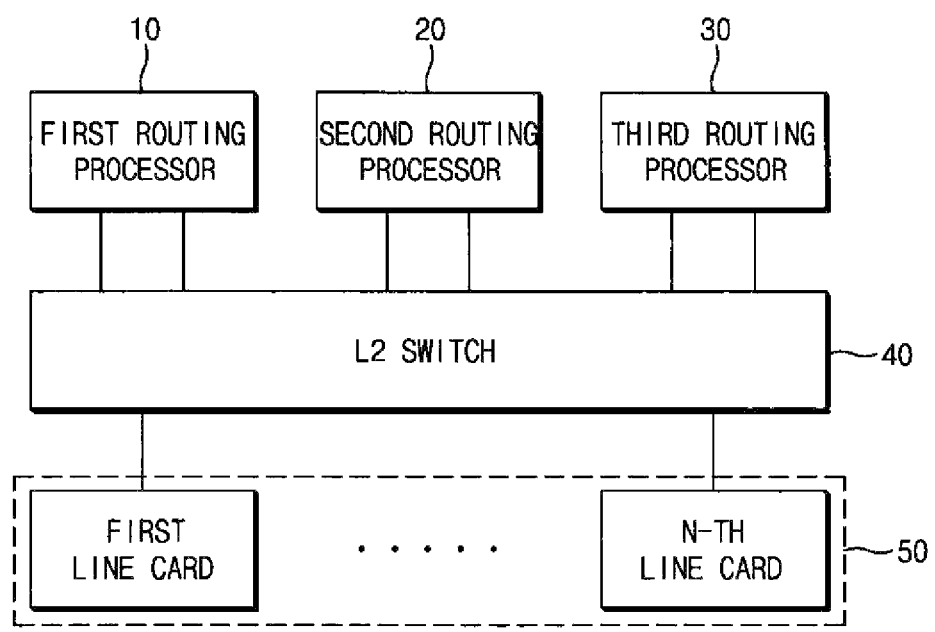
FIG. 1 is a configuration diagram of a packet processing system including a plurality of routing processors according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The aforementioned objects, characteristics, and advantages will be more apparent through the detailed description below related to the accompanying drawings, and thus those skilled in the art to which the present invention pertains will easily implement the technical spirit of the present invention. In the following description, a detailed explanation of known related functions and constitutions may be omitted so as to avoid unnecessarily obscuring the subject matter of the present invention. Hereinafter, exemplary embodiments according to the present invention will be described with reference to the accompanying drawings in detail.

FIG. 1 is a configuration diagram of a packet processing system including a plurality of routing processors according to an exemplary embodiment of the present invention.

As illustrated in FIG. 1, the packet processing system including the plurality of routing processors according to the present invention includes a first routing processor 10, a second routing processor 20, a third routing processor 30, an L2 switch 40, and a plurality of line cards 50.

The first routing processor 10, the second routing processor 20, and the third routing processor 30 as equipment that processes routing of an Internet packet may be personally transited among a slave operation mode, a slave stand-by mode, a master stand-by mode, and a master operation mode according to a predetermined condition. However, at the same timing, only one routing processor should operate in the master operation mode. That is, the routing processor that operates in the master operation mode should be unique.

Herein, the first routing processor 10, the second routing processor 20, and the third routing processor 30 have respective unique IDs and in this case, the IDs as information to distinct whether priorities for operating in the master mode are high or low. To compare the priorities figures are used as one example. The first routing processor 10, the second routing processor 20, and the third routing processor 30 communicate with each other.

The routing processor that operates in the master stand-by mode transmits an ID message (including the ID) for declaring that the routing processor itself is scheduled to operate in the master operation mode after a first threshold time to the routing processor that operates in the slave operation mode, the routing processor that operates in the slave stand-by mode, and other routing processors that operate in the master stand-by mode for a predetermined time. That is, the routing processor transmits the ID message to all of the routing processors. Of course, although the routing processor declares that the routing processor operates in the master operation mode after the first threshold time, the routing processor may not unconditionally operate in the master operation mode. This will be described below in detail.

The routing processor that operates in the master operation mode transmits an ID message (including the ID) for declaring that the routing processor itself normally operates to the routing processor that operates in the slave operation mode or the slave stand-by mode.

The routing processor that operates in the master operation mode transmits routing information processed by the routing processor to the routing processor that operates in the slave operation mode. That is, a routing table managed by the routing processor in the master operation mode and a routing table managed by the routing processor in the slave operation mode are synchronized. This is to, when the failure occurs in the routing processor that operates in the master operation mode afterwards, enable the routing processor that operates in the slave operation mode to rapidly serve as a master.

The L2 switch 40 is equipment that transfers data based on an MAC address as generally widely known and the line card provides a network interface.

Figure 2:
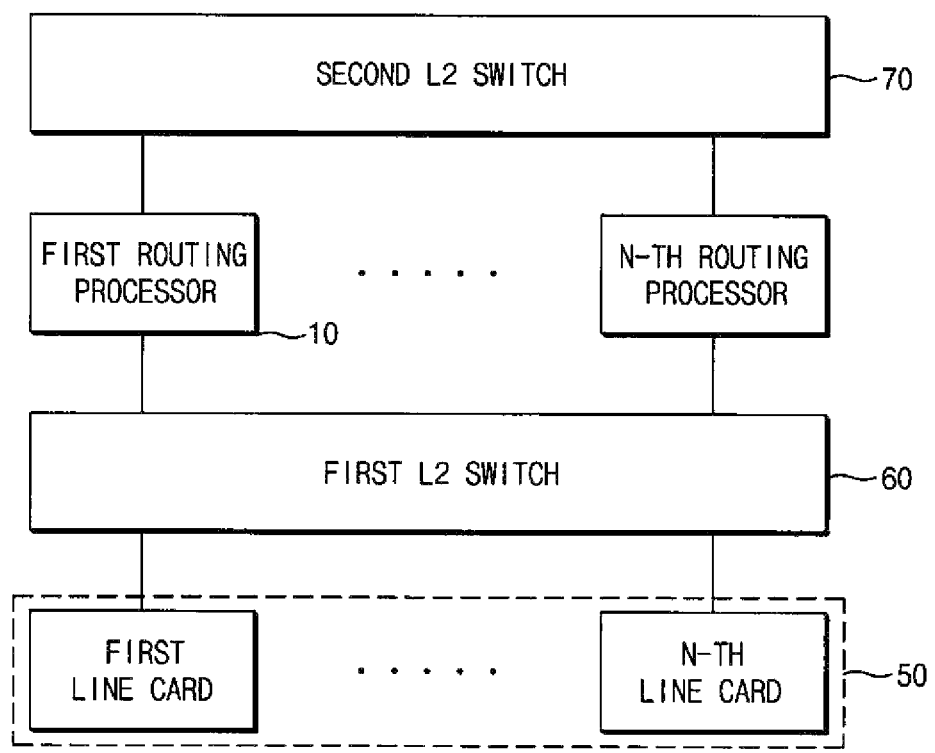
FIG. 2 is a configuration diagram of a packet processing system including a plurality of routing processors according to another exemplary embodiment of the present invention.

Meanwhile, the present invention may be applied to a packet processing system including a first L2 switch 60 that plays a switching role (a packet routing function) for routing processing and a second L2 switch 70 that plays a switching role (a failure response function) for processing traffics (an ID message, a response message, routing information, and the like) among the routing processors in order to reduce the load of the L2 switch 40 as illustrated in FIG. 2.

Figure 3:
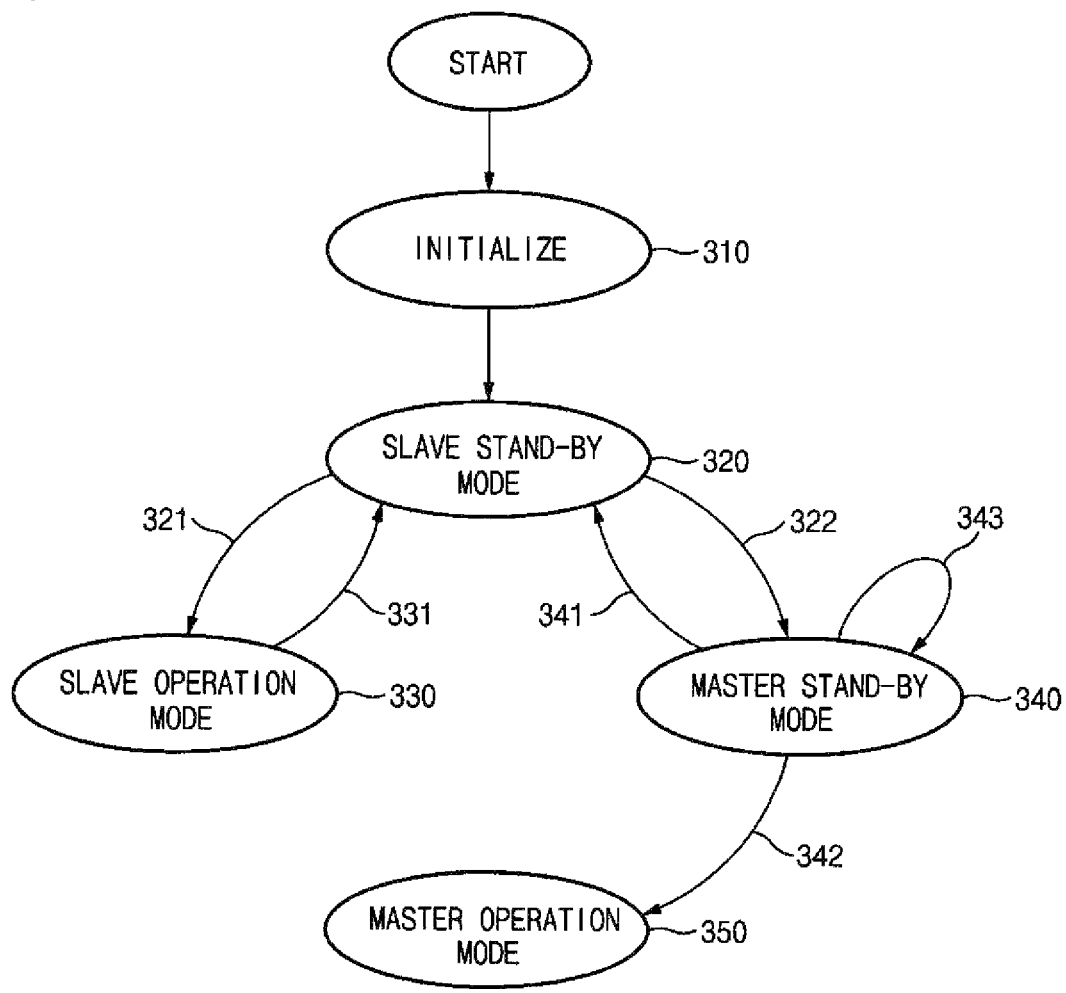
FIG. 3 is a state transition diagram (machine diagram) of the routing processor according to the exemplary embodiment of the present invention.

Hereinafter, a process in which the routing processor is transited among the slave operation mode, the slave stand-by mode, the master stand-by mode, and the master operation mode will be described in detail with reference to FIG. 3. Hereinbelow, the process will be described based on the first routing processor 10 and the routing processor refers to any routing processor other than the first routing processor 10.

First, when the first routing processor 10 is initialized 310, the routing processor enters a slave stand-by mode 320. In this case, the initialization may be single initialization of the first routing processor 10 or initialization of the entire packet processing system, but the resulting mode transition process of the first routing processor 10 follows a process to be described below.

The first routing processor 10 that enters the slave stand-by mode 320 verifies whether an ID message is received for a first stand-by time (a first process). In this case, if a routing processor that operates in a master stand-by mode 340 or a master operation mode 350 exists, the first routing processor 10 receives the ID message from the routing processor.

According to the verification result, when the ID message is received within the first stand-by time, the routing processor 10 determines that the routing processor that operates in the master stand-by mode 340 or the master operation mode 350 exists to immediately enter the slave operation mode 330 (321).

Thereafter, the first routing processor 10 periodically receives the ID message and the routing information from the routing processor that operates in the master operation mode while operating in the slave operation mode 330. This is to, when the failure occurs in the routing processor that operates in the master operation mode afterwards, allow the first routing processor to rapidly serve as the master.

Through such a process, the first routing processor 10 operates in the slave operation mode 330.

Then, when the first routing processor 10 does not receive the ID message or the routing information for a second threshold time, the first routing processor 10 determines that the failure occurs in the routing processor in the master operation mode to enter the slave stand-by mode 320 (331). Thereafter, the first process is performed.

Meanwhile, according to the verification result, when the ID message is not received for the first stand-by time, the first routing processor 10 determines that the routing processor which operates in the master stand-by mode or the master operation mode does not exist to enter the master stand-by mode 340 (322).

Thereafter, the first routing processor 10 periodically transmits an ID message thereof to the routing processor for the first threshold time.

Thereafter, when the first routing processor 10 does not receive the ID message from the routing processor within the first threshold time, the first routing processor 10 enters the master operation mode 350 (342). This means that there is no routing processor that enters the master stand-by mode 340 at substantially the same timing as the timing when the first routing processor 10 enters the master stand-by mode 340. That is, this means that there is no routing processor that enters the master stand-by mode 340 before the first routing processor 10 sends the ID message after entering the master stand-by mode 340.

On the contrary, when the first routing processor 10 receives the ID message from the routing processor within the first threshold time, the first routing processor 10 determines that there is a routing processor that enters the master stand-by mode 340 before the first routing processor 10 enters the master stand-by mode 340 and thereafter sends the ID message. In this case, since the routing processor also transmits the ID message thereof, the first routing processor 10 receives the ID message of the routing processor.

In this case, the first routing processor 10 sequentially compares an ID extracted from the ID message received from the routing processor and the ID thereof, for the first threshold time and stands by in the master stand-by mode when the ID thereof is low (343) and enters the slave stand-by mode 320 when the ID thereof is high (341). In this case, when the first routing processor 10 is in a stand-by state in the master stand-by mode at the timing which is more than the first threshold time, the first routing processor 10 immediately enters the master operation mode 350 (342).

As one example, when it is assumed that the ID message is received three times within the first threshold time, the first routing processor 10 compares an ID extracted from a first ID message and the ID thereof, and as a result, the first routing processor 10 stands by in the master stand-by mode 340 when, the ID thereof is low and immediately enters the slave stand-by mode 320 when the ID thereof is high. In this case, the first routing processor 10 continuously maintains the master stand-by mode 340 because a time when the first routing processor 10 stands by in the master stand-by mode 340 is not more than the first threshold time.

The first routing processor 10 in the master stand-by mode 340 compares an ID extracted from a second ID message and the ID thereof, and as a result, the first routing processor 10 stands by in the master stand-by mode 340 when the ID thereof is low and immediately enters the slave stand-by mode 320 when the ID thereof is high. Even in this case, the first routing processor 10 continuously maintains the master stand-by mode 340 because the time when the first routing processor 10 stands by in the master stand-by mode 340 is not more than the first threshold time.

The first routing processor 10 in the master stand-by mode 340 compares an ID extracted from a third ID message and the ID thereof, and as a result, the first routing processor 10 does not receive a message having an ID lower than the ID thereof within the first threshold time when the ID thereof is low, so that the first routing processor 10 enters the master operation mode 350, and immediately enters the slave stand-by mode 320 when the ID thereof is high.

When the first routing processor 10 enters the slave stand-by mode 320, the first routing processor 10 receives an ID message of a routing processor within the first stand-by time to enter the slave operation mode 330 (321). In this case, since the routing processor operates in the master stand-by mode 340, the first routing processor 10 receives the ID message of the router processor within the first stand-by time.

When the first routing processor 10 enters the master operation mode 350, the first routing processor 10 transmits an ID message (including the ID) for declaring that the routing processor 10 itself normally operates to the routing processor that operates in the slave operation mode or the slave stand-by mode. That is, the first routing processor 10 transmits the ID message thereof to all of the routing processors.

The first routing processor 10 transmits routing information processed by the first routing processor 10 to the routing processor that operates in the slave operation mode.

Figure 4:
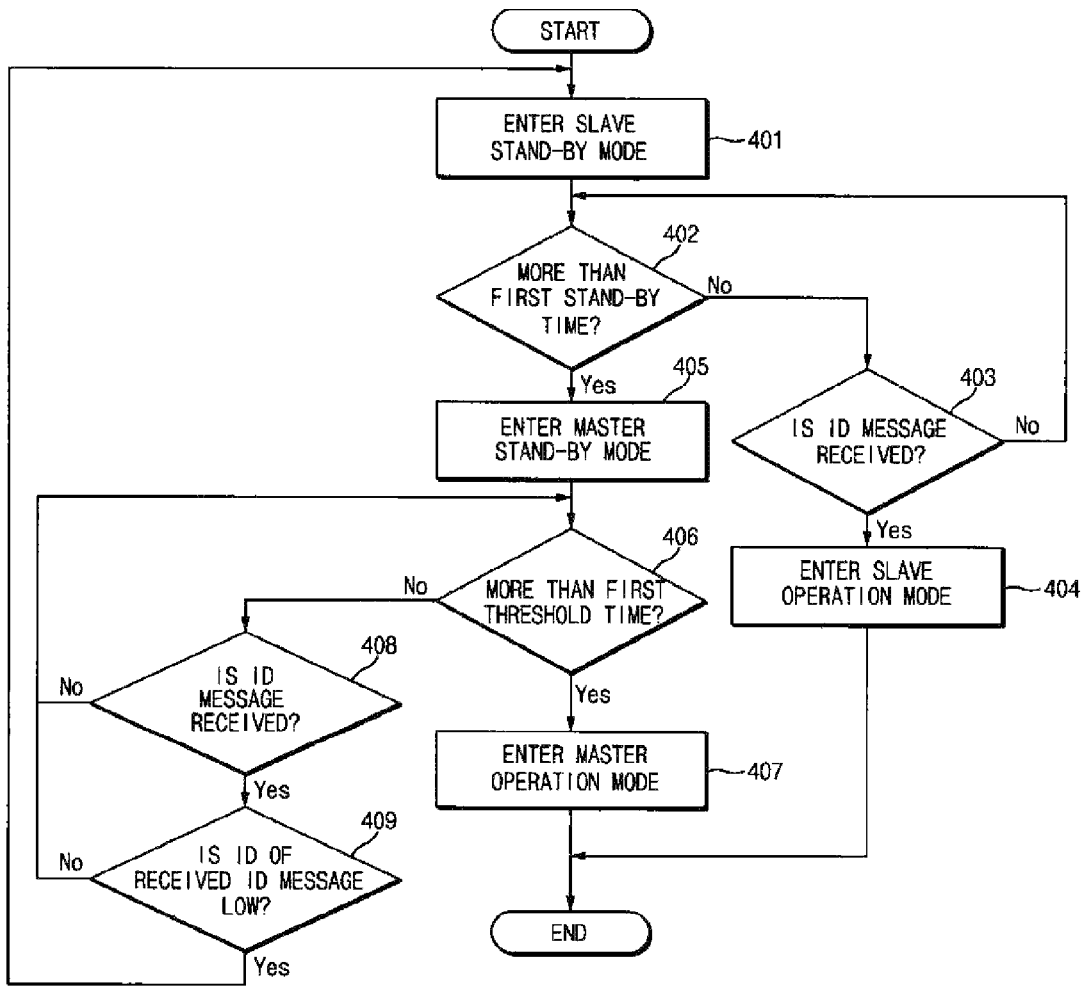
FIG. 4 is a flowchart of a method for transiting an operation mode of a routing processor according to an exemplary embodiment of the present invention.

FIG. 4 is a flowchart of a method for transiting an operation mode of a routing processor according to an exemplary embodiment of the present invention. FIG. 4 illustrates a process in which one initialized routing processor transits an operation mode in a packet processing system including a plurality of routing processors.

First, the routing processor enters a slave stand-by mode 320 (401).

Thereafter, it is verified whether the time when the routing processor stands by in the slave stand-by mode 320 is more than a first stand-by time (402). Since step '402' is performed just after step '401', step '403' is unconditionally performed. That is, step '405' is not performed immediately without step '403'.

According to the verification result (402), when the stand-by time is not more than the first stand-by time, it is determined whether the ID message is received (403), and as a result, when the ID message is not received, step '402' is performed and when the ID message is received, the routing processor enters the slave operation mode (404).

According to the verification result (402), when the stand-by time is more than the first stand-by time, that is, when the ID message is not received within the first stand-by time, the routing processor enters the master stand-by mode 340 (405).

Thereafter, it is verified whether the time when the routing processor stands by in the master stand-by mode 340 is more than the first stand-by time (406). Since step '406' is performed just after step '405', step '408' is unconditionally performed. That is, step '407' is not performed immediately without step '408'.

According to the verification result (406), when the stand-by time is not more than the first threshold time, it is determined whether the ID message is received (408), and as a result, when the ID message is not received, step '406' is performed and when the ID message is received, the routing processor determines whether an ID extracted from the received ID message is lower than the ID thereof (409).

According to the determination result (409), if the ID extracted from the ID message is lower than the ID thereof, the process proceeds to step '401' and if not, the process proceeds to step '406'.

According to the verification result (406), when the stand-by time is more than the first threshold time, that is, when the ID message having an ID lower than the ID thereof is not received within the first stand-by time, the routing processor enters the master operation mode 350 (407).

Figure 5:
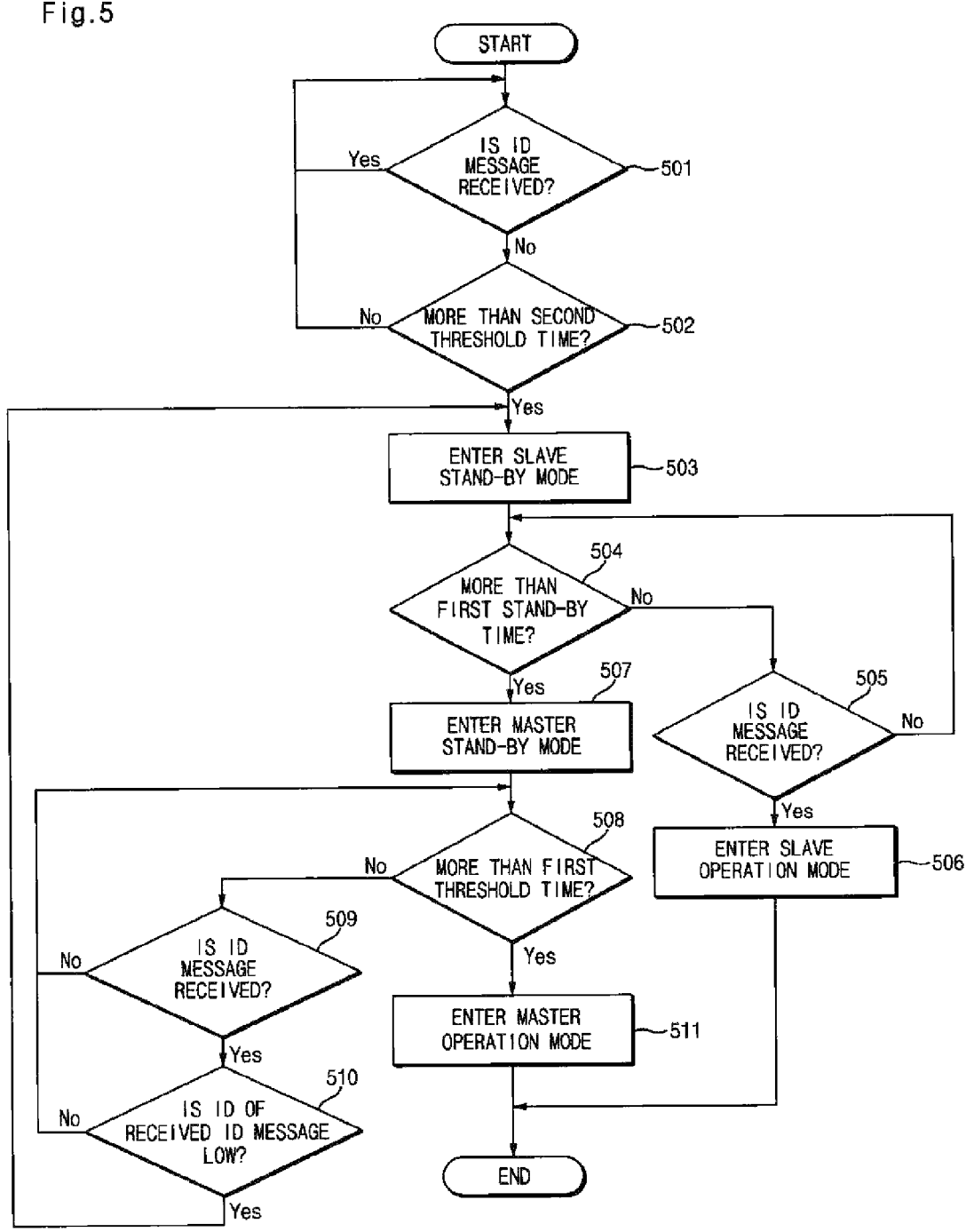
FIG. 5 is a flowchart of a method for transiting an operation mode of a routing processor according to another exemplary embodiment of the present invention.

FIG. 5 is a flowchart of a method for transiting an operation mode of a routing processor according to another exemplary embodiment of the present invention. FIG. 5 illustrates a process in which one routing processor that operates in the slave operation mode transits an operation mode when a master has a failure in a packet processing system including a plurality of routing processors.

First, as the ID message is not received for a second threshold time (501 and 502), the routing processor enters the slave stand-by mode 320 (503).

Thereafter, it is verified whether the time when the routing processor stands by in the slave stand-by mode 320 is more than a first stand-by time (504). Since step '504' is performed just after step '503', step '505' is unconditionally performed. That is, step '507' is not performed immediately without step '505'.

According to the verification result (504), when the stand-by time is not more than the first stand-by time, it is determined whether the ID message is received (505), and as a result, when the ID message is not received, step '504' is performed and when the ID message is received, the routing processor enters the slave operation mode (506).

According to the verification result (504), when the stand-by time is more than the first stand-by time, that is, when the ID message is not received within the first stand-by time, the routing processor enters the master stand-by mode 340 (507).

Thereafter, it is verified whether the time when the routing processor stands by in the master stand-by mode 340 is more than the first threshold time (508). Since step '508' is performed just after step '507', step '509' is particularly performed. That is, step '511' is not performed immediately without step '509'.

According to the verification result (508), when the stand-by time is not more than the first threshold time, it is determined whether the ID message is received (509), and as a result, when the ID message is not received, step '508' is performed and when the ID message is received, the routing processor determines whether an ID extracted from the received ID message is lower than the ID thereof (510).

According to the determination result (510), if the ID extracted from the ID message is lower than the ID thereof, the process proceeds to step '503' and if not, the process proceeds to step '508'.

According to the verification result (508), when the stand-by time is more than the first threshold time, that is, when the ID message having an ID lower than the ID thereof is not received within the first threshold time, the routing processor enters the master operation mode 350 (511).

According to the present invention, through such a process, although the failure occurs in the routing processor that is set in the master operation mode or a manager of the packet processing system initializes the routing processor that is set in the master operation mode or cuts off power, the packet processing system may be normally operated by the routing processor that is set in the slave operation mode.

When a new routing processor is added, the number of routing processors set in the slave operation mode to substitute for the routing processor set in the master operation mode is increased, thereby increasing availability of the packet processing system.

Meanwhile, the aforementioned method of the present invention can be prepared by a computer program. Codes and code segments constituting the program can be easily deduced by a computer programmer skilled in the art. The prepared program is stored in a computer readable recording medium (information storage medium) and is read and executed by a computer to implement the method of the present invention. The recording medium includes all types of computer readable recording media.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

What is claimed is:

1. A method in which one initialized routing processor transits an operation mode in a packet processing system including a plurality of routing processors, the method comprising: verifying whether an ID message is received by entering a slave stand-by mode; operating in a slave operation mode immediately when the ID message is received within a first stand-by time according to the verification result; transmitting the ID message to other routing processors for a first threshold time by entering a master stand-by mode when the ID message is not received within the first stand-by time according to the verification result; and a contention step of entering a master operation mode when the ID message is not received from the other routing processors within the first threshold time in the master stand-by mode and entering a slave operation mode through the slave stand-by mode when the ID message is received.

2. The method of claim 1, wherein the contention step includes:
    comparing an ID of the routing processor and an ID within the received ID message when receiving the ID message;
    entering the master operation mode when the ID of the routing processor is low according to the comparison result; and
    entering the slave stand-by mode when the ID of the routing processor is high according to the comparison result.

3. The method of claim 2, wherein the contention step further includes transmitting the ID message of the routing processor to the other routing processors when the ID of the routing processor is low.

4. The method of claim 2, wherein the contention step further includes periodically transmitting routing information to other routing processors that operate in the slave operation mode when the ID of the routing processor is low.

5. The method of claim 2, wherein the entering of the slave stand-by mode further includes entering the slave operation mode by receiving the ID message from the other routing processors.

6. The method of claim 1, wherein the operating in the slave operation mode further includes updating a routing table by receiving routing information from the other routing processors.

7. A method in which one routing processor that operates in a slave operation mode transits an operation mode when a master has a failure in a packet processing system including a plurality of routing processors, the method comprising: entering a master stand-by mode through a slave stand-by mode when an ID message is not received for a second threshold time; transmitting the ID message to other routing processors in the master stand-by mode for a first threshold time; and a contention step of entering a master operation mode when the ID message is not received from the other routing processors within the first threshold time in the master stand-by mode and entering a slave operation mode through the slave stand-by mode when the ID message is received.

8. The method of claim 7, wherein the contention step includes:
   comparing an ID of the routing processor and an ID within the received ID message when receiving the ID message;
   entering the master operation mode when the ID of the routing processor is low according to the comparison result; and
   entering the slave stand-by mode when the ID of the routing processor is high according to the comparison result.

9. The method of claim 8, wherein the contention step further includes transmitting the ID message of the routing processor to the other routing processors when the ID of the routing processor is low.

10. The method of claim 8, wherein the contention step further includes periodically transmitting routing information to other routing processors that operate in the slave operation mode when the ID of the routing processor is low.

11. The method of claim 8, wherein the entering of the slave stand-by mode further includes entering the slave operation mode by receiving the ID message from the other routing processors.

* * * * *